US010352823B2

(12) United States Patent
Anuzis et al.

(10) Patent No.: US 10,352,823 B2
(45) Date of Patent: Jul. 16, 2019

(54) METHODS OF ANALYSING APPARATUS (71) Applicant: ROLLS-ROYCE PLC, London (GB)

(72) Inventors: Paul Anuzis, Derby (GB); Leonid Moiseevich Gelman, Wellingborough (GB)

(73) Assignee: ROLLS-ROYCE plc, London (GB)

( * ) Notice: Subject to any disclaimer, the term of this patent is extended or adjusted under 35 U.S.C. 154(b) by 1256 days.

(21) Appl. No.: 13/935,924

(22) Filed: Jul. 5, 2013

(65) Prior Publication Data

US 2014/0180606 A1 Jun. 26, 2014

Related U.S. Application Data

(62) Division of application No. 12/085,943, filed as application No. PCT/GB2006/004546 on Dec. 6, 2006, now abandoned.

(30) Foreign Application Priority Data

Dec. 21, 2005 (GB) .................................. 0525936.1

(51) Int. Cl.
*G01B 5/28* (2006.01)
*G01B 5/30* (2006.01)
*G01M 15/14* (2006.01)
*G01M 5/00* (2006.01)
*G01H 1/00* (2006.01)

(52) U.S. Cl.
CPC ............ *G01M 15/14* (2013.01); *G01H 1/006* (2013.01); *G01M 5/0066* (2013.01)

(58) Field of Classification Search
CPC .. G01H 1/006; G01M 5/0066; G01M 5/0033; G01N 29/11; G01N 29/12
USPC ................................................... 702/36, 39
See application file for complete search history.

(56) References Cited

U.S. PATENT DOCUMENTS

| 4,352,293 A | 10/1982 | Kurihara et al. |
| 4,408,294 A | 10/1983 | Imam |
| 4,422,333 A | 12/1983 | Leon |
| 4,918,381 A | 4/1990 | Bender et al. |
(Continued)

FOREIGN PATENT DOCUMENTS

| WO | WO 95/27183 | 10/1995 |
| WO | WO 2004/018981 A1 | 3/2004 |
| WO | WO 2004/090486 A1 | 10/2004 |

OTHER PUBLICATIONS

Elgar et al., "Statistics of Bicoherence and Biphase", Journal of Geophysical Research, vol. 94, pp. 10,9993-10,998, Aug. 1989.*
(Continued)

*Primary Examiner* — Michael P Nghiem
(74) *Attorney, Agent, or Firm* — Oliff PLC (57) ABSTRACT

Engine health monitoring is used to assess the health of an engine, such as a gas turbine engine. Blades mounted on a shaft produce a modal response when excited. The shaft has an order related component that varies with the rotational velocity of the shaft. Modal responses are increased when the natural frequency range of the selected blade mode intersects with one of the order related components. By applying a short time chirp-Fourier transform with a frequency speed that is a function of a rate of change in the rotational velocity of the shaft a selected signal can be isolated. Cracks in the blades can be detected from the isolated signal.

4 Claims, 12 Drawing Sheets

(56) References Cited

U.S. PATENT DOCUMENTS

| | | | |
|---|---|---|---|
| 5,152,172 | A | 10/1992 | Leon et al. |
| 5,258,923 | A | 11/1993 | Imam et al. |
| 5,343,404 | A | 8/1994 | Girgis |
| 5,412,985 | A | 5/1995 | Garcia et al. |
| 5,445,027 | A * | 8/1995 | Zorner ............... 73/593 |
| 5,471,880 | A | 12/1995 | Lang et al. |
| 5,483,833 | A | 1/1996 | Dickens et al. |
| 5,501,105 | A | 3/1996 | Hernandez et al. |
| 6,208,946 | B1 | 3/2001 | Arakawa et al. |
| 6,289,735 | B1 | 9/2001 | Dister et al. |
| 2002/0035438 | A1 | 3/2002 | Prince |
| 2003/0028332 | A1 | 2/2003 | DiMaggio et al. |
| 2005/0126849 | A1* | 6/2005 | Pearson et al. ............ 181/209 |
| 2007/0006636 | A1 | 1/2007 | King et al. |
| 2007/0125174 | A1 | 6/2007 | Ramaswamy et al. |
| 2007/0288103 | A1* | 12/2007 | Choudhury et al. ......... 700/35 |
| 2009/0082976 | A1* | 3/2009 | Anuzis et al. ............. 702/35 |
| 2016/0187227 | A1* | 6/2016 | Anuzis ............... G01H 1/006 702/39 |

OTHER PUBLICATIONS

Definition of Bicoherence, May 2003.*
Jul. 1, 2010 Office Action issued in U.S. Appl. No. 12/085,943.
Dec. 1, 2010 Office Action issued in U.S. Appl. No. 12/085,943.
Sep. 18, 2012 Office Action issued in U.S. Appl. No. 12/085,943.
Apr. 5, 2013 Office Action issued in U.S. Appl. No. 12/085,943.
L. Gelman et al, "New processing techniques for transient signals with non-linear variation of the instantaneous frequency in time"; Mechanical Systems and Signal Processing, Jul. 2006, pp. 1254-1262, vol. 20, No. 5; Bedford, UK.
M. Ottley, "The short-time and higher order chirp Fourier transforms"; Applied Mathematics and Computer Group, Cranfield University, Jun. 22, 2005, Abstract and pp. 1-77.
L. Gelman et al, "Fatigue crack diagnostics: A comparison of the use of the complex bicoherence and its magnitude"; Mechanical Systems and Signal Processing, Jul. 2005, pp. 913-918, vol. 19, No. 4; Cranfield, UK.
Dec. 21, 2016 Office Action Issued in U.S. Appl. No. 15/018,899.

* cited by examiner

METHODS OF ANALYSING APPARATUS

This is a Division of application Ser. No. 12/085,943 filed Jun. 3, 2008 (now abandoned), which is a National Stage of Application No. PCT/GB2006/004546 filed Dec. 6, 2006. The prior applications, including the specifications, drawings and abstracts are incorporated herein by reference in their entirety.

BACKGROUND OF THE INVENTION

Field of the Invention

This invention concerns a method and apparatus for monitoring rotating and reciprocating apparatus and particularly a method and apparatus for monitoring rotating blades mounted on a shaft in a gas turbine engine.

Apparatus with rotary components, such as gas turbine engines, generate signals which are periodic with respect to shaft rotation. The frequency of the signals is related to the angular velocity of the respective shaft and hence the engine speed. These rotation-periodic signals are conventionally known as order components. As the angular speed of rotation increases typically the order components similarly increase in frequency.

At a given engine speed, a number of these engine orders are generally active and result in corresponding vibration responses in the engine which are measurable e.g. as stress or acceleration. Each vibration response generally has the same frequency as the engine order forcing frequency that generated it.

Figure 1:
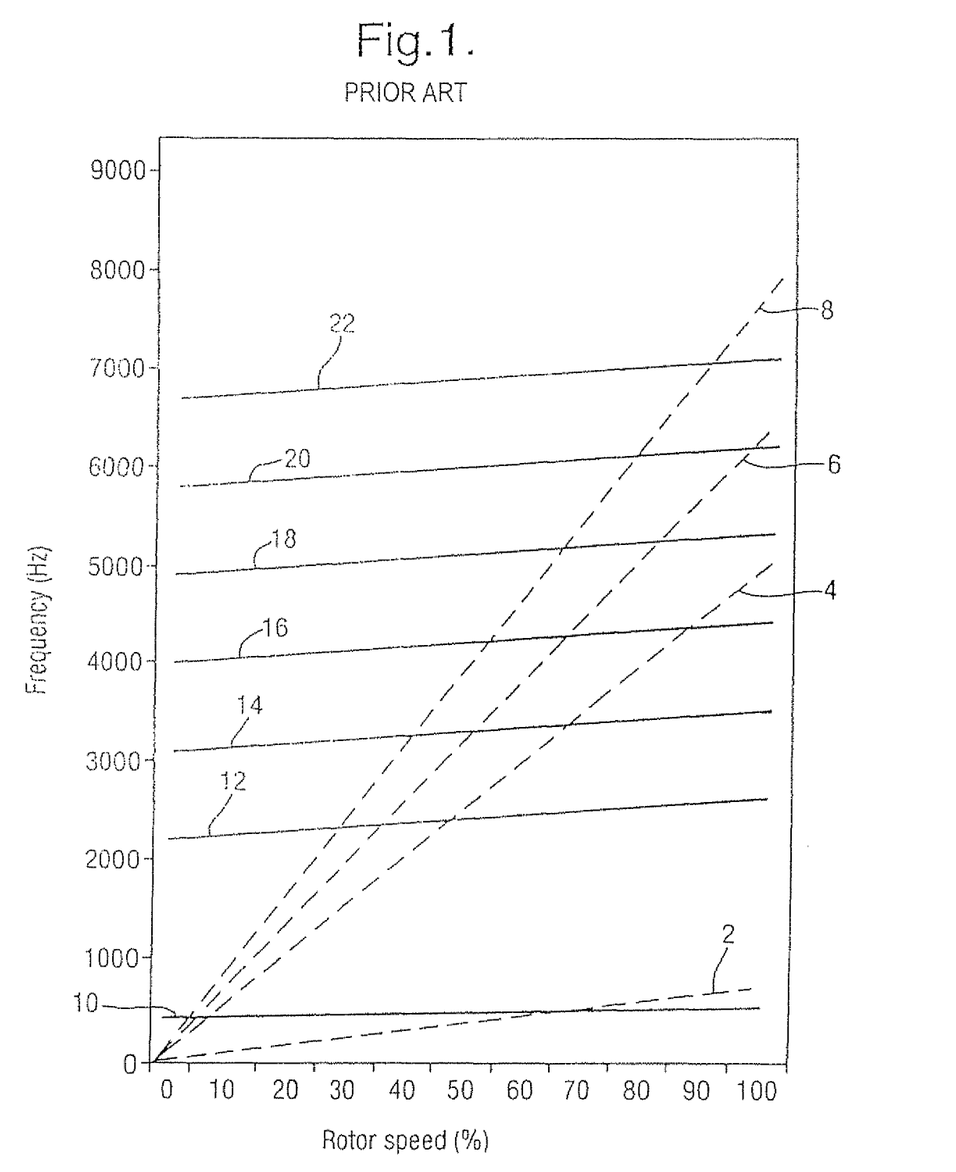
FIG. 1 is a representative Campbell diagram for a shaft in a gas turbine engine having a row of blades.

These orders may be represented graphically. FIG. 1 represents a Campbell diagram for a shaft within a gas turbine engine. The y-axis represents frequency of the rotating shaft in Hertz and the x-axis represents shaft speed in revolutions per minute (rpm).

Each shaft has a number of orders, which represent the first vibration harmonic and subsequent harmonics of the rotating shaft. The first, eighth and eleventh and thirteenth harmonic of the shaft are indicated as lines 2, 4, 6 and 8 respectively on FIG. 1.

When components, such as blades, are mounted to the shaft these are subject to vibration excitation, the amplitude of which is at its greatest when the vibration is at a frequency that corresponds to natural frequency of the blade. Each natural frequency is associated with a particular mode, each of which is a different combination of blade deflections.

The blades can be induced to vibrate at their natural frequency where frequencies of their modes intersect the engine order lines. A typical plot of blade modes is depicted on FIG. 1 as lines 10, 12, 14, 16, 20, 22. A near perfect frequency match of engine order and blade mode is required to produce the highest amplitude vibrations. Certain combinations of blade mode and engine order will produce higher amplitude vibrations than other combinations of blade mode and engine order. To prevent excessive vibration of the blade about its normal position, prudent design practice dictates that the blades be constructed such that the frequencies of the lower modes fall between harmonics of the operating frequency of the turbine. At high amplitude resonant vibrations there is an increased chance of fatigue, cracking and crack propagation within the turbine blades that may give rise to such a failure.

Description of Related Art

It is known to measure the vibrations of the blade to determine the operation and health of the blade. Health monitoring of the blades is important to prevent failure of a component within the engine that may result in significant damage to the engine around and downstream of the failed component.

The vibrations may be measured using, for example, strain gauges, laser transmitters or capacitance and eddy probes. Where a crack, or some other fault is detected in a component it is possible to replace the faulty component before it fails and causes additional damage. Such a replacement results in reduced downtime of the engine and thus an improved cost per hour operation.

In U.S. Pat. No. 4,422,333 it is proposed to use acoustic data to monitor the health of a blade. A microphone is placed adjacent a row of blades and the acoustic energy in the vicinity of the rotating portion sensed to generate a composite representative of the broadband acoustic spectrum. After signal processing the characteristic Doppler waveform of the blade vibrations is displayed and analysed to indicate the location of excessive vibrations.

Each row of blades requires its own microphone to sense the acoustic energy from its respective row. For a complex gas turbine engine, which may have about 20 rows of blades split between the fan, compressor and turbine, significant numbers of sensors are required.

BRIEF SUMMARY OF THE INVENTION

It is an object of the present invention to seek to provide an improved method and apparatus for sampling vibration data from a device that produces an order related response. The method is capable of identifying defects such as, for example, cracks, or other artefacts that may not be defects.

According to a first aspect of the present invention there is provided a method of sampling data from a rotatable shaft comprising the steps: determining at least one order related component of the shaft; determining at least one vibration mode of articles functionally mounted to the shaft; selecting one of the vibration modes; selecting one of the order related components that has an instantaneous frequency which intersects the natural frequency range of the selected mode; rotating the shaft and sampling the data where the instantaneous frequency of the selected order and natural frequency range of the selected vibration mode intersect.

Preferably the shaft is rotated with an increasing or decreasing speed of rotation. Preferably the sampling of the data begins immediately before the selected order and selected vibration mode intersect. Preferably the sampling of the data ends immediately after the selected order and selected vibration mode intersect.

The selected order may be the first engine order.

One of the further problems with the teaching in the prior art document U.S. Pat. No. 4,422,333 is that it fails to provide an effective mechanism to separate the required signal from the background noise of the engine.

Therefore, according to a second aspect of the present invention there is provided a method of isolating a selected periodic response from a plurality of periodic responses, the method comprising the steps: operating a shaft at a varying rotational velocity to provide a signal that comprises a plurality of periodic responses; transforming the signal using a short-time chirp Fourier transform, thereby isolating the selected periodic response and characterised in that the chirp rate of the short-time chirp Fourier transform is a function of the rate of change of the shaft velocity.

The shaft may be one of a plurality of shafts in a gas turbine engine. The varying rotational velocity occurs during acceleration or deceleration of the engine.

The periodic responses may be resonance oscillations of vibration modes of articles functionally mounted to the shaft. Preferably the method further comprises the step of determining the order related component of the shaft, selecting one of the vibration modes of the articles transforming the signal where the order and natural frequency range of selected vibration mode intersect.

The articles may be blades. The signal is a vibro-acoustic signal. Preferably the vibro-acoustic signal is captured by an appropriate transducer, for example, a microphone, accelerometer, strain gauge, pressure transducer, etc.

According to a third aspect of the present invention there is provided a method of determining true collections of peaks in an envelope of vibro-acoustic response data, comprising the steps: a) providing two sample windows each enclosing a portion of the vibro-acoustic response data, b) calculating the mean value of the envelope of the vibro-acoustic response within each window, c) calculating the ratio of mean value in the first window to the mean value in the second window; the second window lagging the first window d) comparing the ratio against a threshold, e) indicating a single peak where the compared ratio equals or exceeds the threshold, f) moving the sample windows along the envelope of the vibro-acoustic response data and repeating steps b) to e) at least once, g) calculating the spacing between adjacent single peaks, h) grouping adjacent single peaks into a collection of peaks, each single peak in the collection being separated from an adjacent single peak by a spacing that is less than a threshold value, adjacent collections being separated by a spacing that is greater than the threshold value, i) removing collections of peaks that have a length less than a threshold, j) calculating the density of the remaining collections of peaks, k) comparing the calculated density of each collection of peaks with a threshold value, wherein the true collections have a calculated density greater than the threshold value.

Preferably the method further comprising the step of providing a further sample window, the further sample window leads the first window with respect to the envelope of vibro-acoustic response data; step c) being modified in that ratio of mean value in the first window to the mean value in the second window and the ratio of the mean value in the first window to the mean value in the further window is calculated; step e) being modified in that a single peak in indicated when both calculated ratios are above the threshold.

According to a fourth aspect of the present invention there is provided a method of determining an artefact in a component comprising the steps: a) exciting the component to induce a resonance response; b) detecting higher harmonics in the averaged power spectral density of resonance response; c) calculating the normalised amplitude of two or more higher harmonics, d) comparing the sum of the normalised amplitude of the two or more higher harmonics with a threshold value thereby determining the presence of an artefact.

The component may be a blade. The blade may be mounted on a shaft. Preferably the blade is excited by rotating the shaft at a selected rotational velocity such that an order related component of the shaft intersects with the natural frequency range of the blade.

According to a fifth aspect of the present invention there is provided a method for determining an artefact in a component comprising the steps: a) exciting the component to induce a resonance response, b) detecting fundamental and higher harmonics in the averaged power spectral density of resonance response, c) calculating the normalised amplitude of two or more harmonics, at least one of the harmonics being the fundamental harmonic, d) calculating the ratio of the sum of the normalised amplitude of the, or each, higher harmonic and the normalised amplitude of the fundamental harmonic; e) comparing the value of the ratio with a threshold, an artefact being determined by comparing the value with the threshold.

The component may be a blade. The blade may be mounted on a shaft. Preferably the blade is excited by rotating the shaft at a selected rotational velocity such that an order related component of the shaft intersects with the natural frequency range of the blade.

According to a sixth aspect of the present invention there is provided a method for determining an artefact in a component comprising the steps: a) exciting the component to induce a resonance response, b) calculating the real and imaginary components of bicoherence b of a resonance response at $pk_0$ and $qk_0$ wherein p and q are integers and $k_0$ is the component resonant frequency, c) determining a location of a point related to calculated components in real and imaginary two dimensional space; the location of the point determining the presence of the artefact.

Preferably the location of the point is compared with a discriminant function. Preferably the discriminant function is linear.

The component may be a blade. The blade may be mounted on a shaft. Preferably the blade is excited by rotating the shaft at a selected rotational velocity such that an order related component of the shaft intersects with the natural frequency range of the blade.

BRIEF DESCRIPTION OF THE DRAWINGS

Embodiments of the present invention will now be described by way of example only and with reference to the accompanying drawings, in which:—

DETAILED DESCRIPTION OF THE INVENTION

As discussed earlier, FIG. 1 represents a Campbell diagram for an intermediate pressure (IP) compressor, the IP compressor being driven by an IP shaft within a Rolls-Royce multi shaft gas turbine engine.

Figure 2:
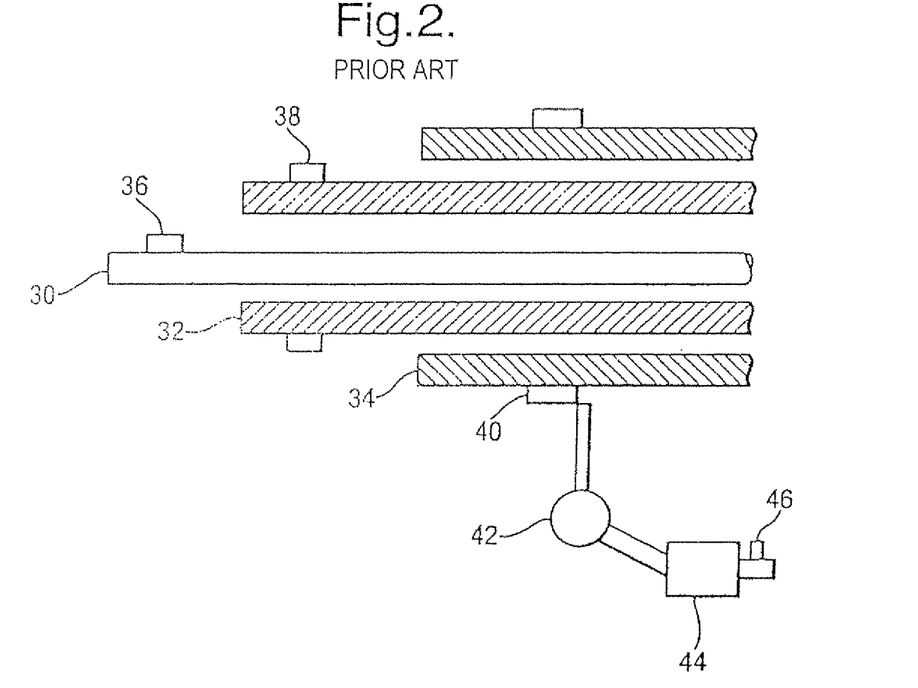
FIG. 2 is a schematic of a three shaft engine.
Figure 3:
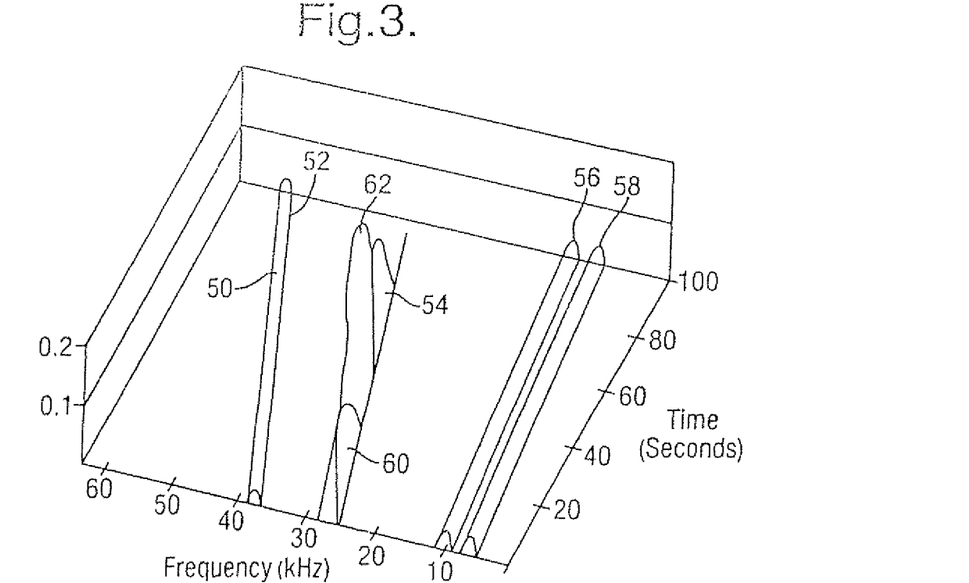
FIG. 3 shows the amplitude-time-frequency distribution of envelope for a LP, IP and HP shaft after extraction from a vibro-acoustic signal, using short time chirp Fourier transform.

FIG. 2 shows a schematic longitudinal section of the three coaxial shafts. Low pressure (LP) shaft 30 occupies the central position and is surrounded in turn by the IP shaft 32 and the high pressure (HP) shaft 34. The LP shaft connects the fan and the LP turbine (not shown), the IP shaft connects the IP compressor and IP turbine (not shown) and the HP shaft connects the HP compressor and the HP turbine.

LP shaft 30 carries a single pole tachometer 36 which is conveniently used for shaft balancing operations. IP shaft 32 carries a 60 pole tachometer 38 which is conventionally used for standard shaft speed measurements for engine control purposes. HP shaft 34 is connected via bevel gear 40 and step aside gearbox 42 to main (external) gearbox 44, with a tachometer 46 connected to the output of the main gear box.

Tachometer 36 produces a signal pulse for each rotation of the LP shaft, and hence the rotational frequency (i.e. shaft speed) of the LP shaft can be determined from the inverse of the period between signal pulses. Tachometer 38 produces 60 signal pulses for each rotation of the IP shaft 32, and hence the rotational frequency of the IP shaft can be determined from the inverse of 60 times the period between the signal pulses. Tachometer 46 measures the rotational frequency of the output of the main gearbox 44. However, as the gearing ratios of the main and step aside gearboxes 44, 42 and bevel gear 40 are known, the rotational frequency of the HP shaft can be inferred from tachometer 46. The rotational frequencies measured by the tachometers provide the engine orders (e.g. fundamental and harmonic components) for each shaft.

It will be appreciated that though a Campbell diagram can be obtained for each shaft, it is a Campbell diagram of the IP shaft that will be considered for the purposes of this description.

The Campbell diagram of FIG. 1 depicts a plot of frequency against the speed of rotation of the IP shaft. Four shaft orders are shown representing the first 2, eighth 4, eleventh 6 and thriteenth 8 engine order.

Connected to the IP shaft is a single stage IP turbine (not shown) and a multi stage IP compressor (not shown). Each stage comprises a single row of multiple blades. Each blade within a stage will vibrate at its natural frequency and each blade within a stage may have slight manufacturing variations, meaning that the natural frequency of blades within a stage may slightly vary across a narrow range.

The natural frequencies of a set of blades for different modes are represented graphically on FIG. 1 as lines 10, 12, 14, 16, 18, 20 and 22. These frequencies are commonly known as frequencies of blade modes and represent mode 1, 2, 4, 12, 15, 18 and 21 respectively. Where the engine orders, for example lines 4, 6 and 8, intersect the blade modes, then resonance will be induced.

Certain combinations of blade mode and engine order will produce a higher resonance response than other combinations of blade mode and engine order. It is a matter of selecting the engine order and blade mode to best facilitate the blade resonance detection.

The fundamental frequencies of engine orders are calculated from the tachometer signals. The frequency of the second order is twice the fundamental frequency at the rotational velocity and so on.

The base-line mean and variance of the natural frequencies of blade modes are measured from experimental data taken during engine development. The data is typically obtained during bench tests, where the blade is clamped and then excited by either shaking or passing an air-jet past over the blade. The obtained data is retained.

A transducer, for example, an accelerometer or microphone, capable of sensing a vibro-acoustic signal, is placed at a position where it can capture the signal of the rotating system of interest. The captured vibro-acoustic data is retained for analysis.

Because the vibro-acoustic data obtained has a large amount of background interference that hides the vibro-acoustic response (signal) of the components of whose health is to be monitored it is necessary to process the vibro-acoustic data. In particular it is necessary to separate the desired response from responses of other components, which are similarly order related and serve to mask the desired signal.

All the vibro-acoustic responses typically have a low signal to noise ratio. To improve the signal to noise ratio the method analyses the frequency responses of the blades mounted within the IP compressor at the points where a natural frequency range of blades intersects a selected engine order and the amplitudes of the blade modal responses are highest.

As the rotational speed of the IP shaft is varied, either by accelerating or decelerating, the natural frequency ranges of blade modes of the first set of blades on the IP compressor cross one or more of the shaft orders; blade resonance responses are generated during these crossings. Similarly, the natural frequency ranges of blade modes of the second, third and fourth sets of blades also cross the shaft orders; blade resonance responses are also generated during these crossings. Correspondingly, the natural frequency ranges of modes of blades attached to the LP and HP shaft will also cross their respective shaft orders; blade resonance responses are also generated during these crossings. The captured vibro-acoustic data includes all these resonant responses in addition to other interference. Consequently it is necessary to isolate the desired signal.

It is important to note that whilst advanced time-frequency techniques, such as Wigner-Ville or wavelet transforms, can be used for processing non-stationary vibro-acoustical shaft orders having a linear and non-linear variation of the shaft frequency in time; however, these forms of processing lose accuracy in comparison with short-time chirp-Fourier transform.

The signal obtained during acceleration and deceleration is obtained during nonlinear variation of the shaft frequency in time. This signal may conveniently be called a "piecewise engine order" and is processed using a short-time chirp-Fourier transform. This transform has the form:

$$S(f, T, c_2) = \int_{-\infty}^{\infty} h(t-T) x_1(t) e^{-j2\pi\left(ft + \frac{c_2(t)}{2}t^2\right)} dt$$

where $h(t)$ is a time window, $x_1(t)$ is a "piece-wise engine order", T is the centre of the window and $c_2(t)$ is the variable frequency speed of the transform, f is frequency.

The frequency speed of the transform is constant throughout the duration $\tau_i$ of constant frequency speed of a "piece-wise engine order" i=1, 2, . . . N, N is a number of linear parts in the piece-wise frequency-time dependency of a "piece-wise engine order".

By frequency speed it is meant the speed of frequency change or, to put it another way, the rate of change of the frequency, or "chirp rate".

The short-time chirp-Fourier transform could be used with different windows, e.g. a rectangular window, a Gaussian window, Hamming window etc. It selectively detects the piece-wise shaft orders whilst the shaft speed is varied.

As discussed above, the recorded vibro-acoustic data comprises order related components from the LP, IP and HP shafts. The selected order related components from the IP shaft is isolated from the order related components of the other shafts by evaluating the piece-wise frequency-time dependency of the selected order related components and frequency speed for each part of the dependency and processing the acoustic or vibration data by the short-time chirp-Fourier transform with appropriate durations and frequency speed. By appropriate durations it is meant durations of the selected order related components with constant frequency speed.

In this example the frequency speed of engine order 1 of the IP shaft is 0.027 Hz/s. Consequently, the frequency speed of the transform for detecting the blade resonances excited by IP engine order 4 is 4 times that value i.e. 0.108 Hz/s.

Figure 4:
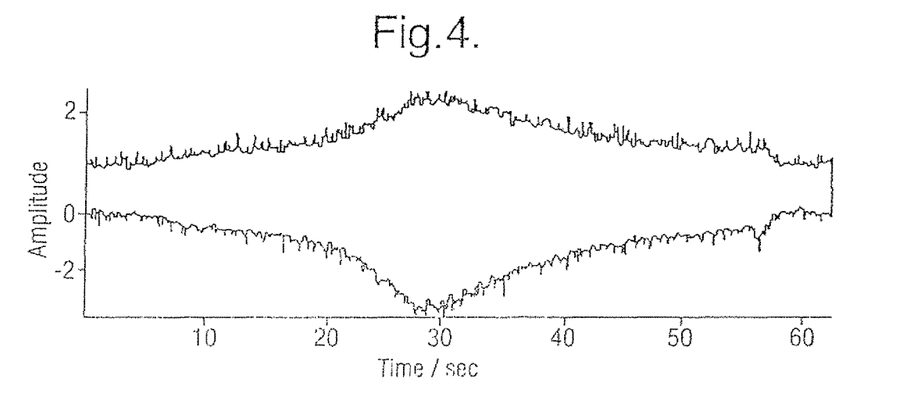
FIG. 4 is a typical amplitude response of a blade in the time domain under excitation from order related components with changing rotational velocity.

After transform it is possible to graphically represent the frequency responses for the IP, LP and HP shafts on 3D plot of amplitude vs instantaneous frequency and time; such a plot is depicted in FIG. 4.

In FIG. 4, as the engine accelerates i.e. time increases, the value of instantaneous frequency of the engine orders similarly increases. Separated out from the data obtained by the transducer and processed by the short-time chirp-Fourier transform is a frequency/time/magnitude plot of two shaft orders of the HP shaft 50, 52, and a frequency/time/magnitude plot of the 4th order of the IP shaft 54, and plots of two shaft orders of the LP shaft 56,58.

Looking at the frequency/time/magnitude plot of the IP shaft it is possible to see that the magnitude varies both with time and frequency. Peaks are observed where the instantaneous frequency of $4^{th}$ shaft order of the IP shaft intersects with the natural frequency range of the blade modes of the blades connected to the IP shaft. The first peak 60 related to the resonant oscillations of a first row of blades and the second peak 62 related to the resonance oscillations of a second row of blades. Other peaks along the order may relate to resonant oscillations of higher modes of the blade rows. It is possible to determine which row and which mode is excited at a given frequency by referring to the Campbell diagram for the relevant shaft.

As it is possible to separate out the frequency response of each order for each shaft it is possible, with further signal processing, to detect peaks in the data and identify their timing, duration, frequency and amplitude. Beneficially, because the engine accelerates and decelerates through the range of natural frequencies of the blades mounted to each shaft in an engine it is possible to obtain and isolate data on each row of blades from one set of vibro-acoustic data and to then signal process these separately.

After applying the short-time chirp-Fourier transform as described above it is possible to determine the magnitude of the short-time chirp-Fourier transform vs. time and instantaneous frequency for each order of the IP shaft.

$$CT_x(t,f)$$

From the tachometer signal it is possible to obtain the piece-wise time-frequency variation $f_{IP}(t)$ of the first engine order of the IP shaft.

The envelope of magnitude of chirp Fourier transform of the selected nth engine order of the IP shaft can therefore be:

$$S(T,f_{IP},c_2)$$

Figure 5:
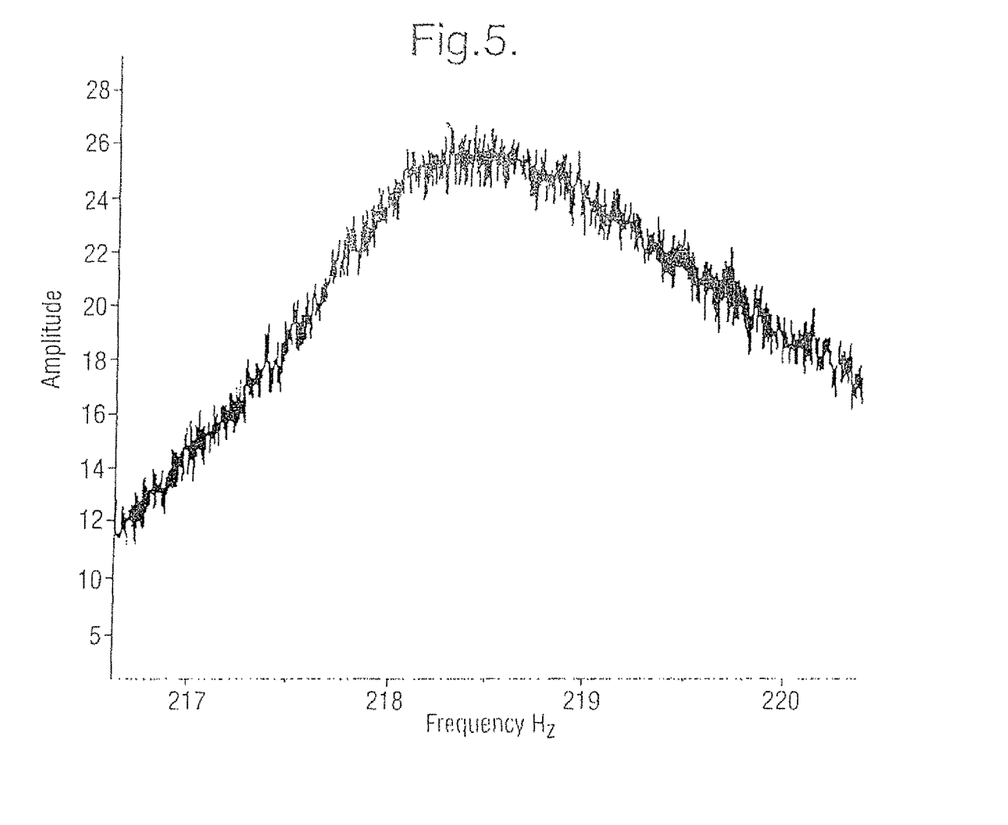
FIG. 5 is a typical amplitude envelope of a blade in the frequency domain under excitation from order related components with changing rotational velocity (high signal/noise ratio)
Figure 6:
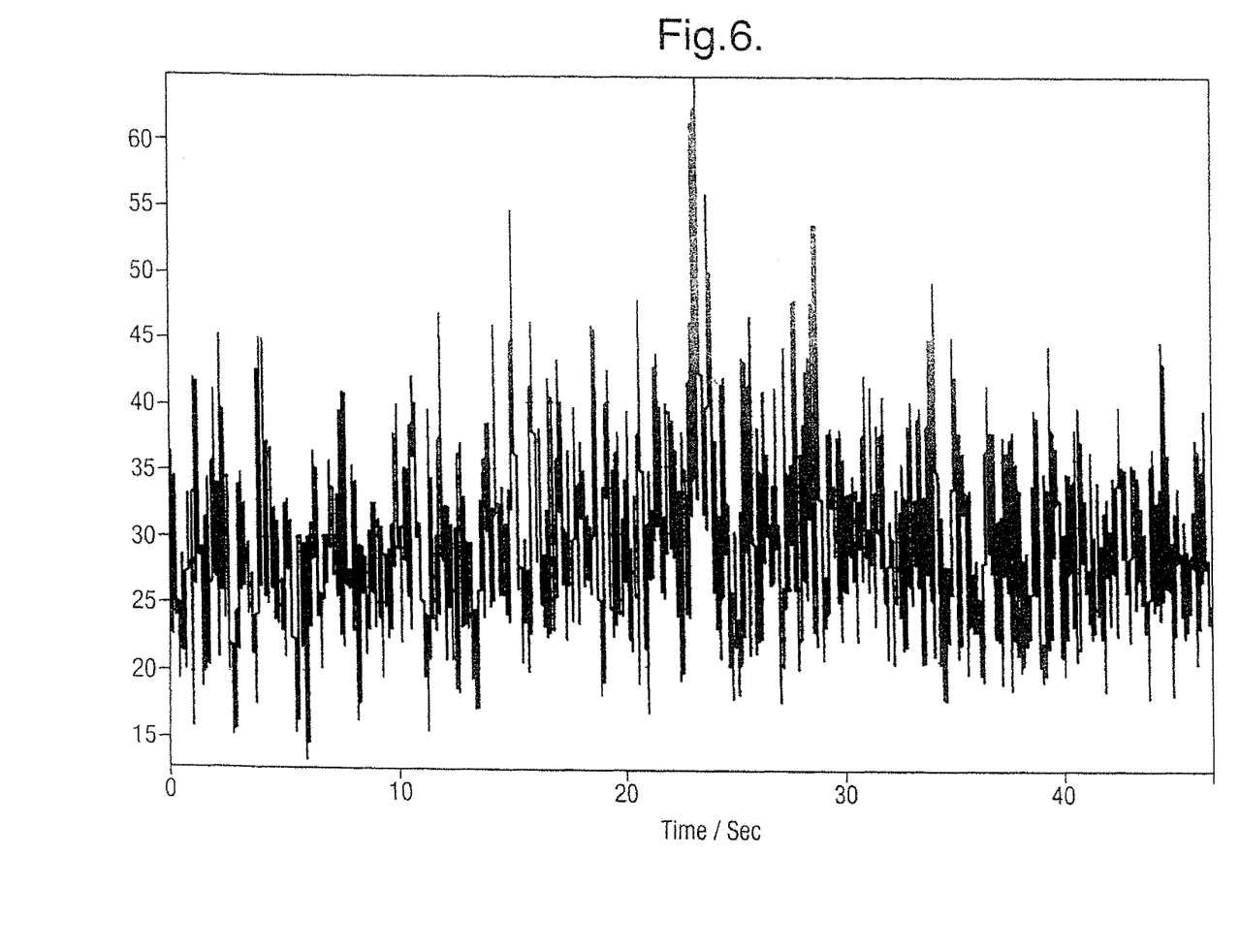
FIG. 6 is a typical amplitude envelope of a blade in the time domain under excitation from order related components with changing rotational velocity (low signal/noise ratio).

The envelope may be displayed in both the time and frequency domain as shown in FIG. 4 and FIG. 5. The blade resonant peaks may be detected from either of these envelopes using similar methods, but for the purpose of this description the detection method using the envelope in the time domain will be described.

The signal is still relatively noisy and it is necessary to distinguish true blade resonance peaks from false peaks.

Figure 7:
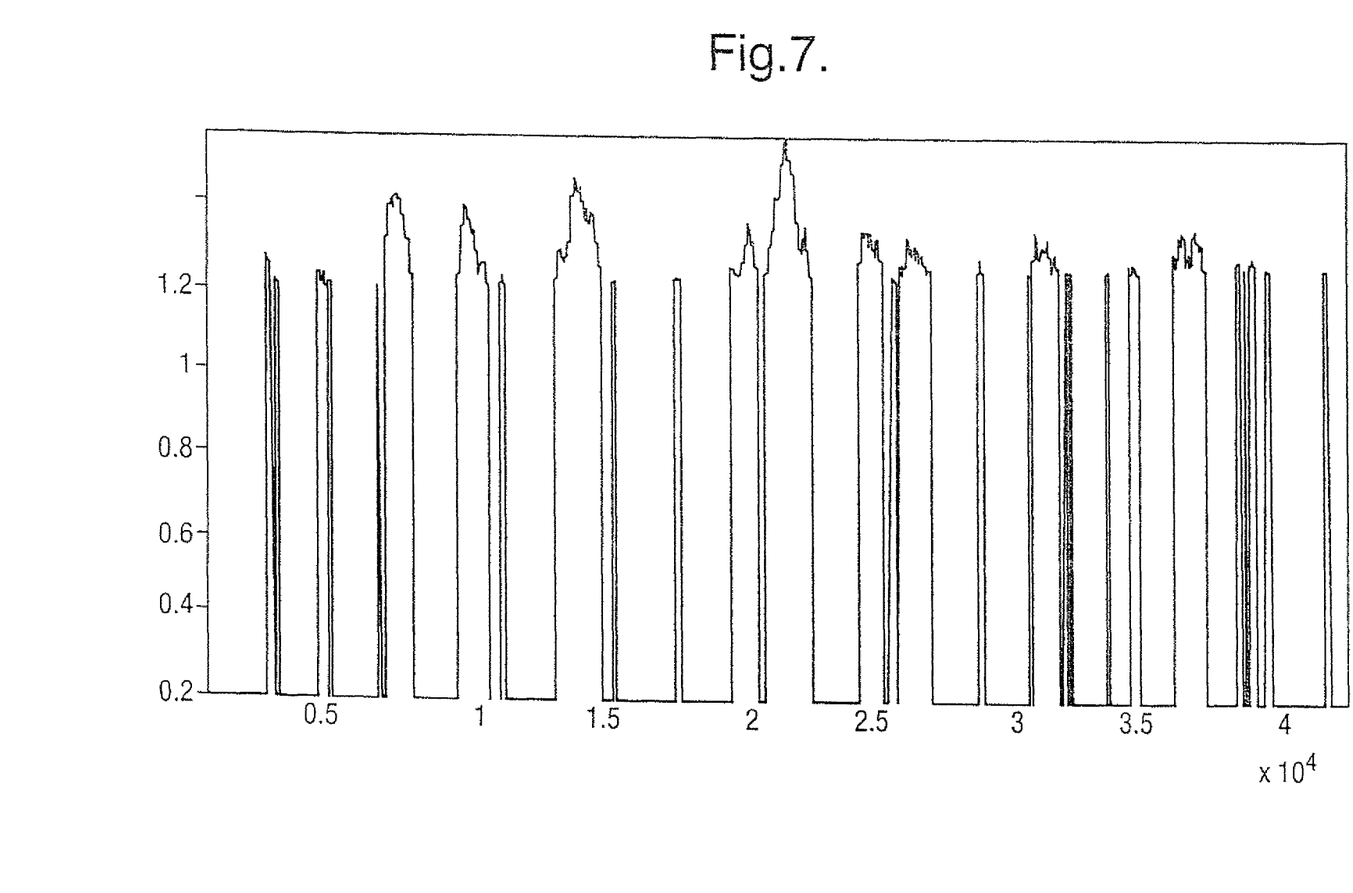
FIG. 7 depicts detected single peaks within the envelope of vibro-acoustic signal
Figure 8:
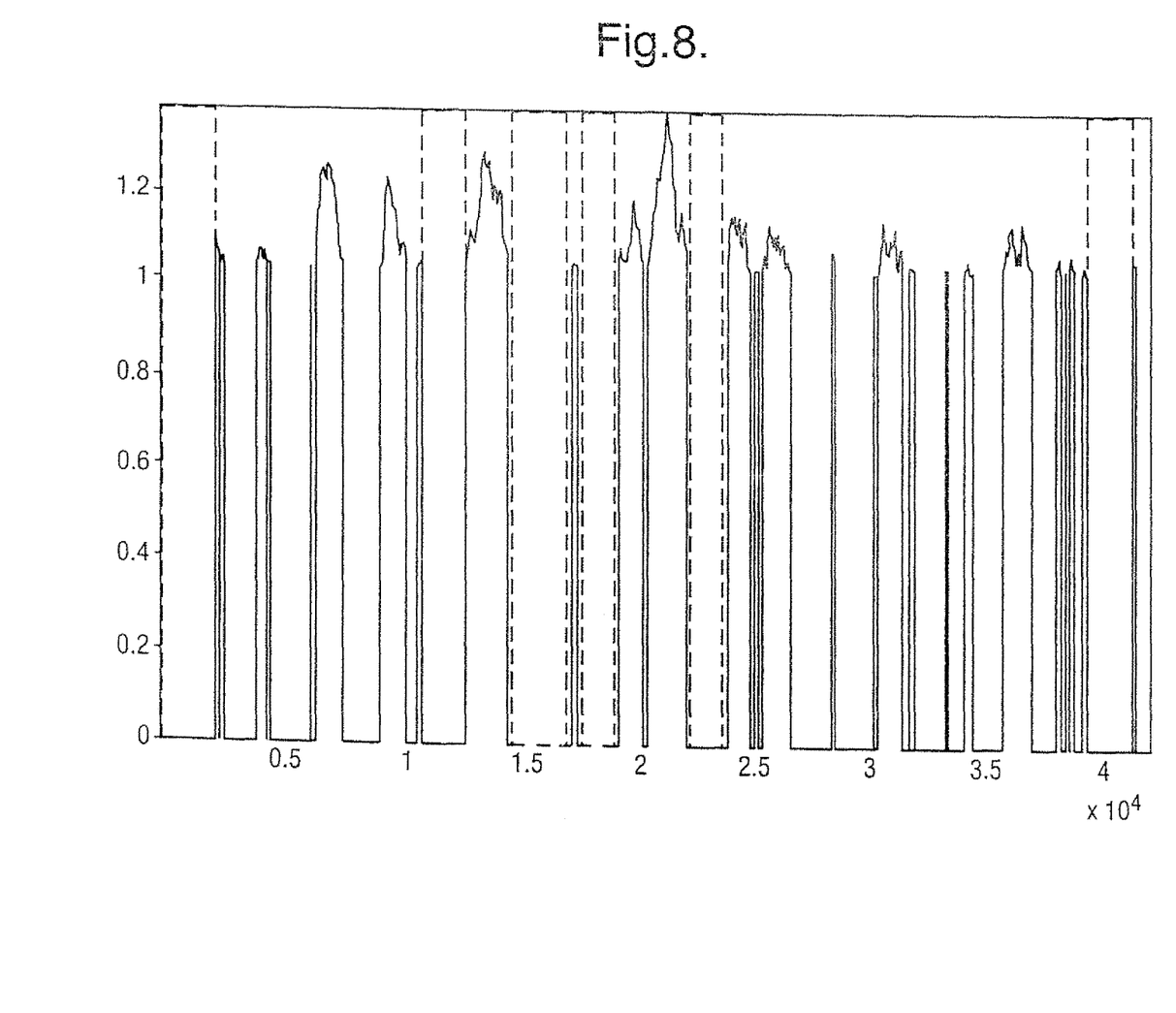
FIG. 8 depicts the collections of single peaks, the collections being separated by gaps greater than a pre-determined size, here there are 6 collections depicted

A first method, conveniently known as a two moving window method, is described with reference to FIG. 6-10. Two data windows are used to analyse amplitude of envelope against time. The windows are scanned through the data range with their size and spacing being maintained, the right window leading the left window. The mean value within each window is calculated and if the ratio of the mean value in the first window compared with the mean value in the second window is above a threshold then a "single peak" is said to be detected at the time corresponding to the centre of the first window. The second window being located to the left of, or lagging the first window After scanning the windows through the envelope data a series of "single peaks" have been detected. These are shown in FIG. 7, where the Y axis is the calculated ratio and the X axis is the time. To estimate whether detected single peaks are true resonance peaks or false peaks, firstly the gap durations between adjacent peaks is calculated and the single peaks grouped into collections of peaks, each collection being separated by gap duration above or equal to a threshold value. This is depicted in FIG. 8. Thus, within each collection the peaks are separated from adjacent peaks by a gap duration that is less than the threshold value.

Figure 9:
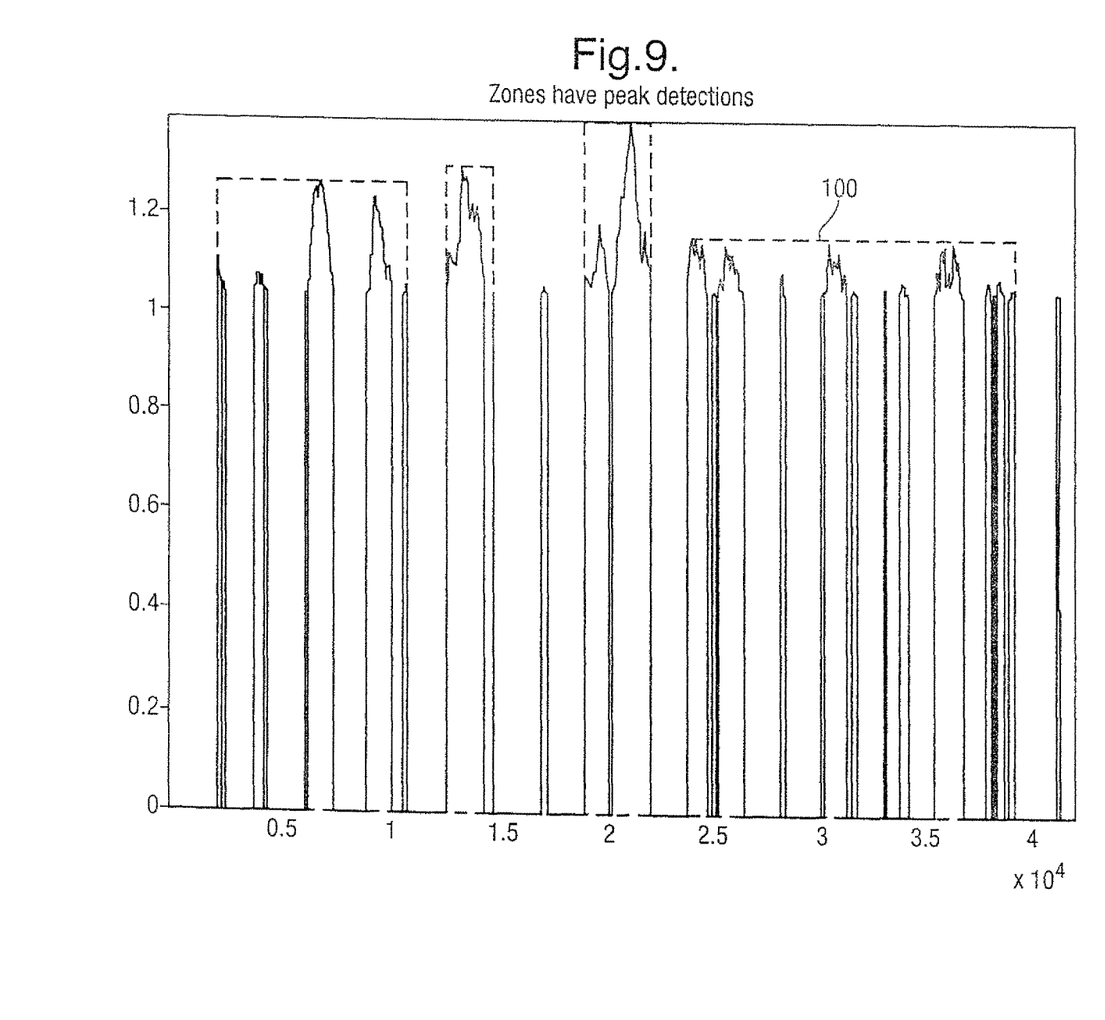
FIG. 9 depicts collections of single peaks that have a duration greater than a pre-determined value, 4 collections are depicted

The time duration of each collection of peaks is then calculated and, if the duration is less than a threshold value, the collection of peaks is determined not to be related to blade resonance and is discounted from further consideration. In FIG. 9, the collection of peaks are grouped within hatched lines 100.

Figure 10:
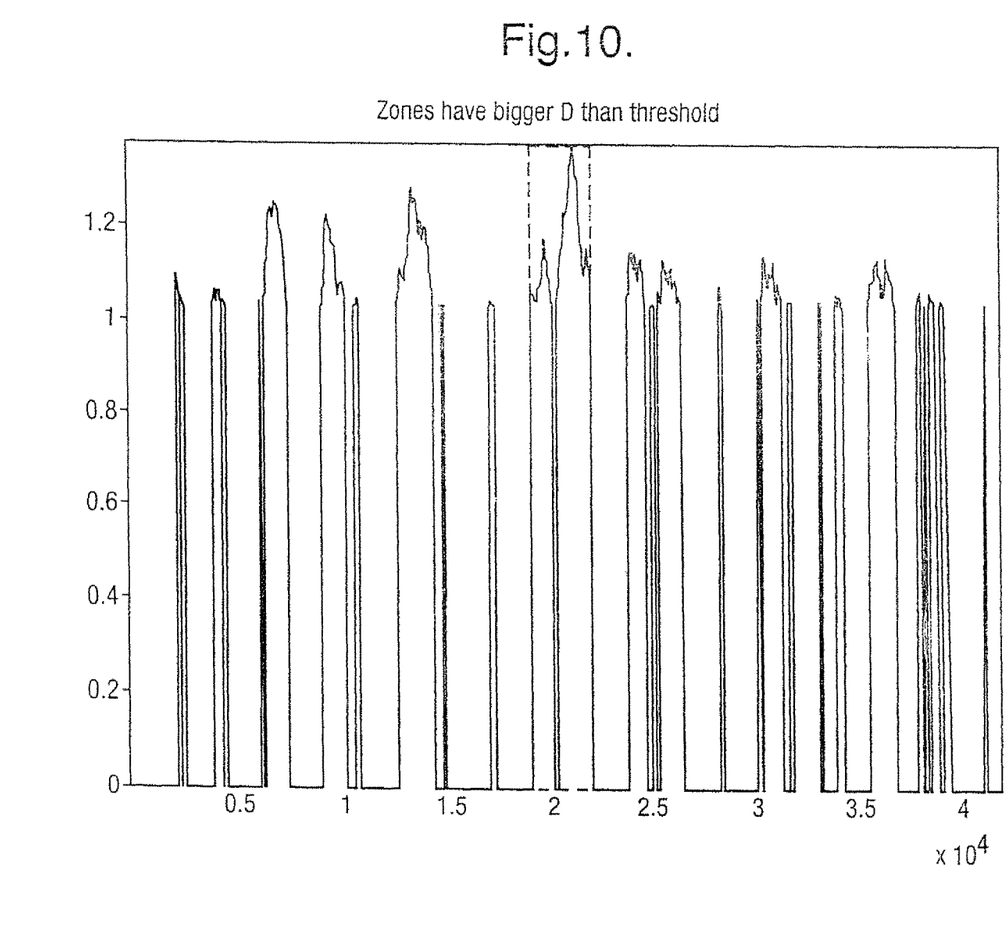
FIG. 10 depicts collections of single peaks that have a density greater than a pre-determined value, 1 collection is depicted

The density of these collections of peaks is then calculated and compared with a threshold value. Any collection of peaks that is above the threshold is considered to be related to blade resonance, all other collections of peaks are considered to be false peaks. The result of applying this threshold value is depicted in FIG. 10, where a single collection of peaks related to blade resonance is detected.

It will be appreciated that the threshold values used can be determined empirically based on blade parameters and by analysis of the blade resonance oscillations. For the example given above, the gap duration threshold is 2 seconds, the collection duration is 3 seconds and the collection density is 65%.

The second method of determining the presence of true peaks from false peaks is to use a three window method. This is substantially the same method as the two window method except that the "single peak" detection is based on the following equation:

$$\frac{S_c}{S_l} \geq t \cap \frac{S_c}{S_r} \geq t$$

where $S_i$, $S_l$, and $S_r$ are mean values of envelope in the central, left and right windows respectively.

Thus, if ratios of the "signal mean" in the central window to the "interference mean" in the left and right windows are simultaneously more than threshold, then the "single peak" detection is true.

The size and separation of the windows is selected empirically primarily based on the blade parameters and by analysis of the blade resonance oscillations.

By this method the amplitudes of resonance peaks corresponding to the frequency of the first and higher blade modes may be found. These values can be used to determine the health of the blades.

The nonlinearity level of a blade increases with the appearance of a fatigue crack.

Figure 11:
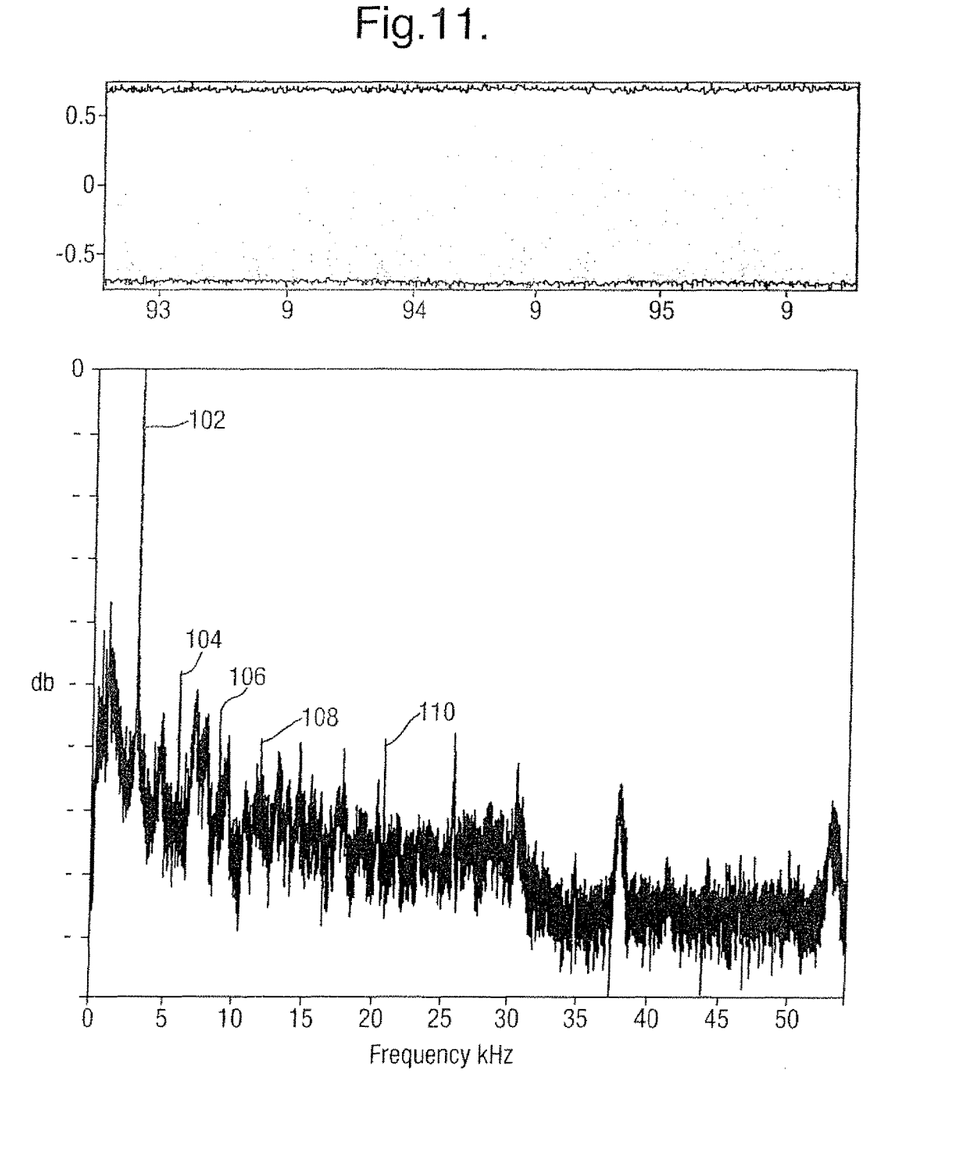
FIG. 11 depicts the power spectral density of resonance response of an un-cracked blade.

FIG. 11 depicts the power spectral density response of an un-cracked blade at resonance over a 3 second duration. Applying the Fourier transform it is possible to generate a plot of the Fourier magnitude of the signal in the frequency domain. In the example described in FIGS. 11-13 the frequency response is taken from a bench shaker test and the data relates to the fourth shaft order.

Fundamental and higher harmonics of blade resonance oscillations are identified in the data using the moving window method in the frequency domain using three windows as described above. For the un-cracked blade the fundamental frequency and a number of higher harmonics are detected as depicted by numerals 102-110.

Figure 12:
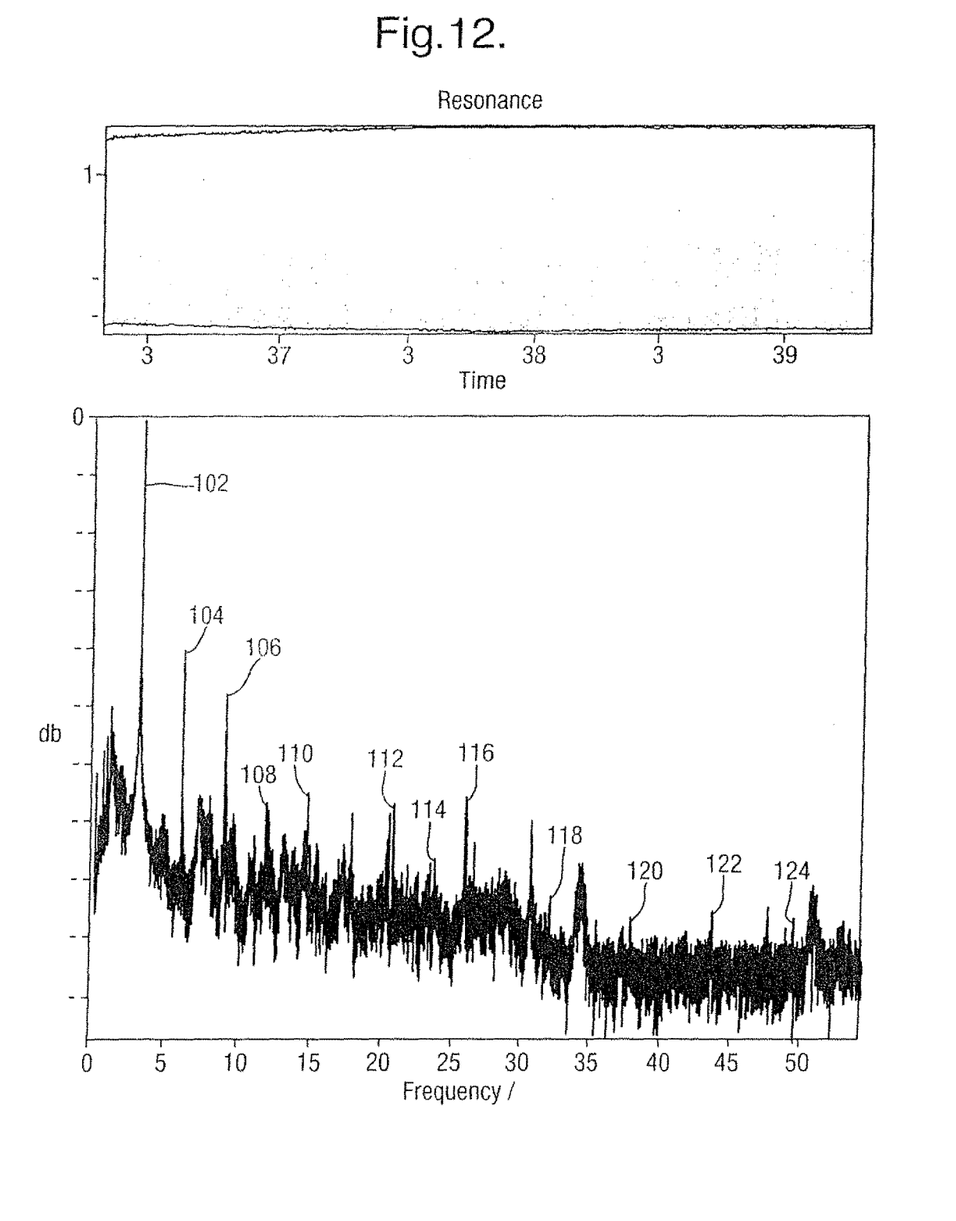
FIG. 12 depicts the power spectral density of resonance response of a cracked blade.

A cracked blade having an 8% crack size provided a resonance response as depicted in FIG. 12. After applying the Fourier transform the Fourier magnitude in the frequency domain can be plotted. This is substantially of the same form as the plot for the un-cracked blade. However, upon application of the peak detection method in the frequency domain a number of higher harmonics are detected that were not able to be detected for the blade in its un-cracked condition. The harmonics detected are indicated as numerals 102 to 124.

The sum of the normalised spectral amplitudes of higher harmonics of the blade resonant oscillations for each of the cracked and un-cracked situations can be calculated using the formula:

$$F_1 = \sum_{i=k}^{N} \overline{X}_i$$

where $\overline{X}_i$ represents the normalised harmonic amplitude of blade resonance oscillations, and can be represented as:

$$\overline{X}_i = \frac{2X_i}{X_L + X_R}$$

$X_i$ is the un-normalised harmonic amplitude of blade resonance oscillations, $X_L$ and $X_R$ are averaged spectral amplitudes (i.e. interference amplitudes) of left and right windows.

The ratio of this sum to the normalised amplitude $\overline{X}_1$ of the fundamental harmonic is then calculated from:

$$F = \frac{\sum_{i=k}^{N} \overline{X}_i}{\overline{X}_1}$$

Figure 13:
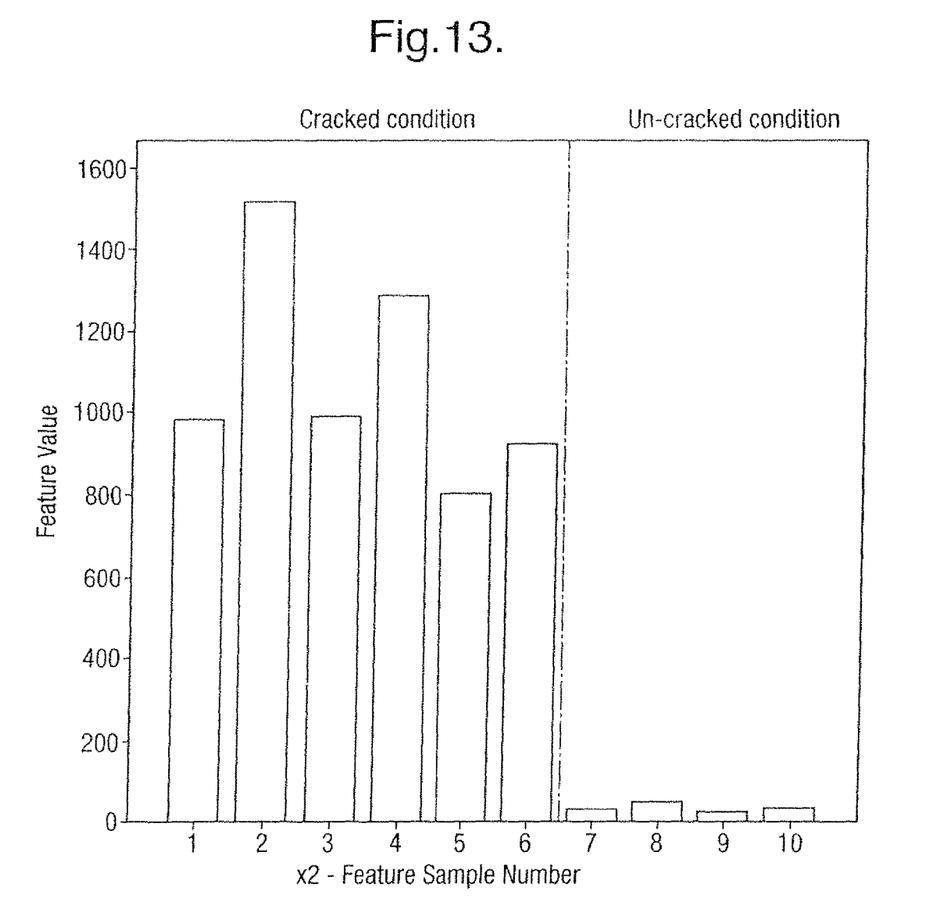
FIG. 13 depicts the sum of the normalised amplitude of two or more higher harmonics against sample number of cracked and un-cracked blade.

From FIG. 13 it will be apparent that this value for F is indicative of a cracked blade. This figure, on the right hand side the value of F calculated after four tests of the un-cracked blade. On the left hand side are six values of F calculated after six tests of the cracked blade.

The value for F may be compared against a threshold value to determine the cracked condition. Since each test can give slightly different values for F an alternative is to average F over a number of tests and to compare the average with the threshold.

In an alternative method it is the sum of the amplitudes of the normalized higher harmonics that is compared with a threshold value to determine the presence of a crack.

In a further method the presence of a crack is determined using bicoherence. The bicoherence depends on two frequencies and is defined by the Fourier transforms of blade resonance at three frequencies and can be represented by the equation:

$$b(k_1, k_2) = \frac{\sum_{m=1}^{M} X_m(k_1) X_m(k_2) X_m(k_1 + k_2)^*}{\sqrt{\sum_{m=1}^{M} |X_m(k_1)_m X(k_2)|^2 \sum_{m=1}^{M} |X_m(k_1 + k_2)|^2}}$$

where $X_m(k)$ is the discrete Fourier transform of the mth segment of the blade resonance oscillations at discrete frequency k, * is complex conjugate operator.

Bicoherence contains phase information between harmonics of blade resonance oscillations.

When diagnosing a crack it is the real and imaginary components of bicoherence at frequencies that are integer multiples of the resonant frequency of the blade:

$$b(pk_0, qk_0)$$

where k0 is the blade fundamental resonant frequency and (p, q) is an integer pair. p and q may be any integers.

Figure 14:
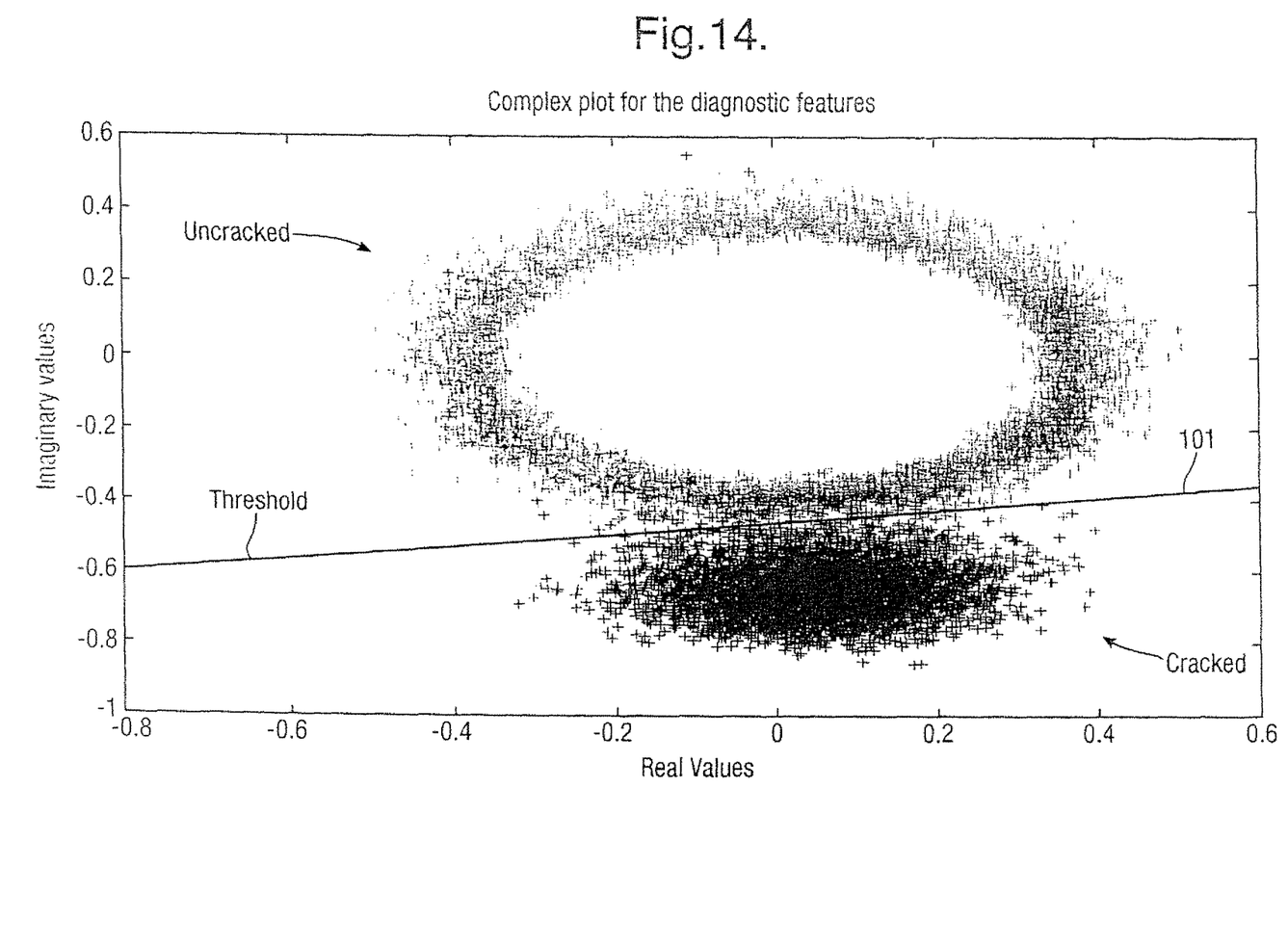
FIG. 14 is a graphical representation of the calculated real and imaginary components of bicoherence for cracked and un-cracked blades.

Bicoherence is a measure of coupling between two selected harmonics of the blade resonance oscillations. The real and imaginary components of the bicoherence of the two selected harmonics p and q are compared with a discriminant function 101 to determine the presence of a crack.

FIG. 14 depicts a complex plot of the calculated real and imaginary components of the bicoherence for fundamental and second harmonics of blade resonance oscillations i.e. p=1 and q=2. The plot is made in two dimensional space for the blade in an uncracked condition and additionally in the cracked condition—with an 8% crack. The position and area of real and imaginary components of bicoherence value of the fundamental and second harmonics for cracked blades is notably different from the area of real and imaginary components of bicoherence value of the fundamental and second harmonics for un-cracked blades.

Once a crack is detected it is possible to repair or replace the blade in which it is located. This may be done as part of a special service, or at the next scheduled service if the blade will survive till that point.

Various modifications may be made without departing from the scope of the invention.

For example, other time-frequency transforms may be used e.g. wavelet, Wigner-Ville in place of the short-time chirp-Fourier transform, though with a reduced accuracy.

The technology finds application in marine, industrial gas turbines engines and for other rotating machinery, such as diesel engines or compressors. It can be used to detect other order related responses from bladed disks, gears or other components where a resonant response may be initiated through rotation of the component.

It will be appreciated that whilst the invention has been described with respect to using a single transducer to record the vibro-acoustic data, multiple transducers may equally be used. The multiple microphones, which may be directional, may record data from single components or stages. Other forms of device (e.g. beamforming system, etc.) that record vibro-acoustic data may replace the single transducer.

It will also be appreciated that the method may be realised by programming a computer to run the method steps described in this invention. The computer program may be stored on a recording media.

The invention will also have application in reciprocating apparatus, such as spark ignition engines, where periodic signals are generated in response to the movement of a piston or such like. Similarly, where pressure vessels such as a ship or other container are pressure tested by cycling through a series of pressure or temperature values, if a frequency response is induced it is possible to adapt the invention as described herein, with routine skill and experimentation, to such apparatus and thereby determine if there is a change to the apparatus.

What is claimed is:

1. A method for determining an artifact in a component, the method comprising:
    a) exciting the component to induce a resonance response;
    b) calculating real and imaginary components of bi-coherence b of the resonance response at $pk_0$ and $qk_0$, where p and q are integers and $k_0$ is a component resonant frequency;
    c) determining a position or area of the calculated real and imaginary components in two-dimensional space; and
    d) determining the presence of the artifact in the component from the position or area of the calculated real and imaginary components;
   wherein the component is a blade;
   wherein the blade is mounted on a shaft; and
   wherein the blade is excited by rotating the shaft at a selected rotational velocity such that an order related component of the shaft intersects with the natural frequency range of the blade.

2. The method according to claim 1, wherein
   the shaft is operated between a first rotational velocity and a second rotational velocity different from the first rotational velocity with a rate of change of shaft velocity to provide a signal that comprises a plurality of periodic responses,
   the signal is transformed using a short-time chirp Fourier transform, thereby isolating a selected periodic response, and
   a frequency speed of the short-time chirp Fourier transform is a function of the rate of change of the shaft velocity.

3. The method according to claim 2, wherein the varying rotational velocity occurs during acceleration of the engine.

4. A method for determining an artifact in a component, the method comprising:
    a) exciting the component to induce a resonance response;
    b) calculating real and imaginary components of bi-coherence b of the resonance response at $pk_0$ and $qk_0$, where p and q are integers and $k_0$ is a component resonant frequency;
    c) determining a position or area of the calculated real and imaginary components in two-dimensional space;
    d) determining the presence of the artifact in the component from the position or area of the calculated real and imaginary components; and
    e) correcting the artifact in the component.

* * * * *